United States Patent [19]

Callegari, Sr. et al.

[11] Patent Number: 4,701,869
[45] Date of Patent: Oct. 20, 1987

[54] PIPE MEASUREMENT, LABELING AND CONTROLS

[75] Inventors: Stephen R. Callegari, Sr., 419 Orangewood Dr., Lafayette, La. 70503; Luther A. Harrison; Robert W. Salsman, Jr., both of Lafayette, La.

[73] Assignee: Stephen R. Callegari, Sr., Lafayette, La.

[21] Appl. No.: 715,829

[22] Filed: Mar. 25, 1985

[51] Int. Cl.[4] .............................................. G01D 5/34
[52] U.S. Cl. .................................. 364/562; 73/151.5
[58] Field of Search ............... 364/561, 562, 420, 421, 364/422; 73/151.5

[56] References Cited

U.S. PATENT DOCUMENTS

| | | | |
|---|---|---|---|
| 4,156,467 | 5/1979 | Patton et al. | 364/562 |
| 4,195,699 | 4/1980 | Rogers et al. | 73/151.5 |
| 4,224,509 | 9/1980 | Cheng . | |
| 4,234,942 | 11/1980 | Prause et al. | 364/562 |
| 4,333,006 | 6/1982 | Gorin et al. . | |
| 4,417,816 | 11/1983 | Kindl et al. . | |
| 4,427,882 | 1/1984 | Touru et al. . | |
| 4,431,912 | 2/1984 | Dickson et al. . | |
| 4,434,971 | 3/1984 | Cordrey | 364/562 |
| 4,459,752 | 7/1984 | Babcock . | |
| 4,468,959 | 9/1984 | Roberts . | |
| 4,553,217 | 11/1985 | Daudt et al. | 364/562 |
| 4,616,321 | 10/1986 | Chan | 73/151.5 |

FOREIGN PATENT DOCUMENTS 1003451 9/1965 United Kingdom ................ 364/562

OTHER PUBLICATIONS

"Computer-Controlled Laser Beams in Object Dimension Measurements", by Johansson et al., Optical Engineering, vol. 18, No. 4, pp. 384–386, 7-1979.

Primary Examiner—Parshotam S. Lall
Attorney, Agent, or Firm—John D. Jeter

[57] ABSTRACT

A combination of systems to measure the length of pipe sections and to label the pipe surface with machine readable labels. The combination also commits to memory the data and specifications read from the label or derived from correlative information already in memory. Summation of pipe joint data and specifications provide overall pipe string data. From the collective pipe string data, the reaction of the string to the input of physical forces can be predicted and evaluated.

9 Claims, 2 Drawing Figures 4,701,869

PIPE MEASUREMENT, LABELING AND CONTROLS

This invention pertains to the measurement of the length of pipe joints and the automatic labeling of pipe surfaces with related information.

RELATED PATENTS

The following issued U.S. patents pertain to art associated with individual sub-systems incorporated into the combination of systems utilized in the apparatus and method of this invention: U.S. Pat. Nos. 4,224,509 issued Sept. 23, 1980; 4,333,006 issued June 1, 1982; 4,417,816 issued Nov. 29, 1983; 4,427,882 issued Jan. 24, 1984; 4,431,912 issued Feb. 14, 1984; and 4,459,752 issued July 17, 1984.

BACKGROUND

The processes related to drilling and casing earth boreholes are well known. Earth boreholes are produced through the use of pipe strings known as drill strings. The boreholes, once drilled, are cased with a different form of pipe string cemented into the earth. Yet another pipe string is commonly suspended inside the casing to conduct fluids produced far below to the earth surface. The pipe strings are interrelated in many respects, and it is important that drilling and well completion people have the lengths of pipe rather accurately measured as an assembly in each case. In the past, the measuring art has yielded many errors with serious economic and safety consequences.

At the present time, there are two general classifications of pipe used in earth borehole operations, primarily in oil and gas well drilling and oil and gas production:

(1) shouldered pipe joints used in drilling; and
(2) non-shouldered pipe joints used in casing and in production tubing.

Shouldered pipe is used in well drilling and added to the drill string joint-by-joint as the well is deepened by drilling. During drilling activity, the drill string is occasionally removed from the well to change drill bits and other components, usually near the bit. During these "round trips," the drill string is usually separated in three joint "stands" and set back on the rig floor in a vertical stance to await reassembly in reverse order, as the drill string is once more assembled into the well to resume drilling.

During the removal phase of the "round trip," the driller and others remain alert for any signs of damage on any emerging pipe joint or its connections. Any damaged joint will be removed and "laid down," so that it will not be later reassembled into the drill string. The total length of all such laid down joints must be made up by the addition of new pipe joints. The new joints will be pulled up to the rig floor from the pipe racks at the rig site.

From the beginning of the assembly, the pipe joint drawn up to the rig floor will be "strapped." This is an act of measuring the shoulder-to-shoulder length, usually with a steel measuring tape. The driller maintains a pipe tally of all lengths added to the drill string. Since there may eventually be in the order of five hundred drill string joints and shorter reamers and stabilizers, as well as jars and downhole motors, the tally is necessarily large. With the occasional laid down joints and new additions, the volumnous tally is often modified. Some of these tally changes are interrupted by occasional shift changes of all rig floor personnel. Some confusion is inevitable.

An entire production zone can be erroneously logged in terms of distance below the earth surface due to errors in pipe length. Subsequent completion operations such as perforating can miss the production zone. To reduce this likelihood, considerable expense is incurred in logging wells independently of drill strings.

When non-shouldered pipe is installed in a well, a different set of problems arises. Non-shouldered pipe has a variable thread make-up responsive to connection geometry and makeup torque applied. The total joint length is measured and thread make-up allowance is subtracted. The problem of continual round tripping related to the drill string does not occur with non-shouldered pipe.

In addition to the errors cited above, pipe strings suspended in great length stretch several feet due to axial strain from load. With drill string, drillers use prepared tables to indicate stretch to be expected. In drilling, the bit load applied at the bottom changes drill string total length. Changes in pressure applied to the drill pipe to force drilling fluids to circulate also change pipe length.

OBJECTS

It is therefore an object of this invention to provide apparatus and methods to measure the length of pipe string components by electromagnetic radiation processes and to mark the resulting data on the pipe without human transcription of the information.

It is another object of this invention to provide apparatus and methods to measure the length of pipe string components by electromagnetic radiation processes, combine the measurement with specification information, and to apply machine readable labels to the pipe in response to information derived from measurement.

It is yet another object of this invention to place a machine readable axial position index on pipe string components in conjunction with the labeling process, such that the distance between adjacent indices on made-up pipe suspended in a well bore can be machine measured.

It is yet another object of this invention to provide a rig floor pipe label reader that reads labels on pipe string components and adds the label contents to the string run-in data registers.

It is still a further object of this invention to provide apparatus to read labels from drill string components at the rig floor, compare an identifier such as a serial number with well site inventory data storage, confirm connector compatibility, and place the associated data in the drill string tally register.

These and other objects, advantages, and features of this invention will be apparent to those skilled in the art from a consideration of this specification, including the attached drawings and appended claims.

SUMMARY OF THE INVENTION

A combination of pipe positioning, pipe handling, length measurement, surface labeling and associated computer equipment to measure pipe and place labels on the pipe containing pipe joint related data in a form readable by common symbol pattern recognition equipment. Optional equipment can determine material information for inclusion on label information.

Innovation

Having described the problems related to pipe strings before and after assembly into a well bore, attention is now invited to problem solutions made practical by apparatus, combinations, and methods of this invention.

Available technologies are collectively applied to eliminate the need for manual data transcription. From the first act of pipe joint measurement to the use of the composite physical characteristic of the assembled pipe string, manual transcription and manual mathematical processing are minimized. Processing of collective data, to the extent practical, is caused to serve a cascade of purposes in the interest of accuracy and speed without manual transcription.

Maximum advantage is taken of existing systems which, collectively, serve to make up the combination of this invention. Lasers, for instance, offer an excellent medium for measuring lengths, but this action alone leaves the principal problem of diligence in record keeping and further processing the collective pipe string specifications for use.

Descriptions related to computers as used herein are related to common usage and not to the science of computer or software design. Inputs will refer to information entered into the computer from outside the computer. Outputs will refer to information passed from inside the computer to things outside the computer. Internal computer processes will be defined in general terms in light of ends to be achieved.

It is recognized that short term data storage will likely be in solid state registers, and long term storage will likely be on some form of magnetic medium. Data storage and registers such as pipe string tally registers may be regarded as optional storage forms and are not to be regarded in a limiting sense.

Information referred to as being in particular registers are convenience statements. As long as a classification of information can be swept by any identifier for a specific purpose, it may be regarded as sequestered in defined registers, whether or not such physical registers exist.

The definition of a computer as used herein is a system made up of units which are pieces of hardware (electronic circuits, printed-circuits boards, switches, lights, etc.) that perform operations on given inputs to obtain required outputs. These operations are performed by a particular set of steps arranged (programmed) to occur in a particular order.

Marking of the pipe joints may be accomplished by any suitable method; at least a partial list of candidate systems is below:
(1) mechanical indentations;
(2) surface painting;
(3) installation of stainless steel or plastic banding materials which have been premarked with the coded information;
(4) installation of flexible labels with high strength epoxy;
(5) indentations made by electro-magnetic beam.

Reading may be accomplished by any suitable method; at least a partial list of candidate systems is below;
(1) holographic techniques (laser-barcode readers);
(2) optical emission;
(3) mechanical detection;

It is reasonable to expect simple, painted-on bar codes about the pipe periphery to last to the well site, and that system may be used alone or in conjunction with other systems such as chemical etch. Painted-on bar codes, or equivalent, would serve the inventory need for drilling string. Anything painted on would likely soon be worn off. An etched-on serial number could then be used to relate a particular pipe joint to its specifications, because the specifications would have been read into data storage before the paint wears off. For drill string components, there are certain advantages in using a number format that is both manually readable and machine readable. Such numbers would need protection from surface wear, and a small milled recess in the tool joint makes this practical.

BRIEF DESCRIPTION OF DRAWINGS

In the drawings, wherein like reference characters are used throughout to designate like parts.

DETAILED DESCRIPTION OF THE DRAWINGS

Figure 1:
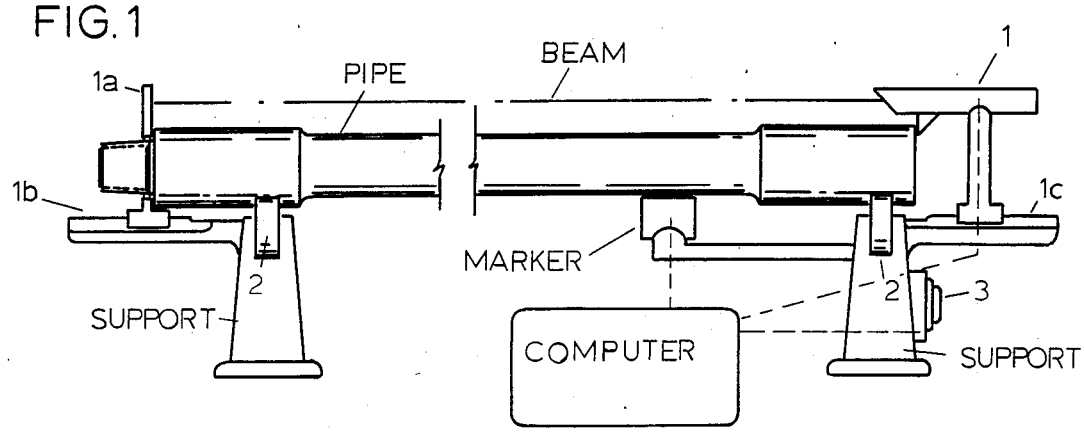
FIG. 1 is a generally schematic diagram of the combinations of this invention.

In FIG. 1, the mechanical system deals primarily with the measuring of pipe lengths and the placement of label information on the pipe. This system will be used in conjunction with pipe racks (not shown) which facilitate the rolling of pipes in serial order in front of the measuring system as shown. The preferred laser 1, movable on rail 1c, moves in to contact the pipe end. The target 1a moves in on rail 1b until it contacts the pin shoulder on drill string. If non-shouldered pipe is being measured, the target will be stopped by the pipe end.

The activated laser measures the length and the information goes directly to the computer. The computer directs the marker (a laser is preferred) to impress the information desired onto the pipe surface.

Data other than length to be put on the label is made available to the computer by any of the inputs common to the art. We prefer the keyboard input, but consider a magnetic strip card with manually readable data to be practical and safe.

The supports are self explanatory. The wheels 2 roll the pipe if the label is to be put on more than one place. If a full periphery axial index line is to be used, the wheels are driven, while a line is generated by the marker beam. The wheels are powered by motor 3 on cue from the computer.

When the wheels are used, the rails supporting the pipe are dropped when the pipe joint is aligned. The dropped portion is only long enough to allow the pipe in position to rest in the notch effect formed by two somewhat spaced wheels. The wheel axes are parallel to the axis of the pipe.

The computer can be rather simple. A display is needed to confirm reasonableness of data to be marked on the label. Data storage is essential. We prefer a CRT display, hard copy printout ability, and disc data storage ability. Peripheral computerized ability to handle accumulated data for inventory purpose and for processing data to yield pipe string operational information will be described later.

The use of alternative label forms must be considered. The label may be formed on a separate material and stuck on the pipe before or after the length code is added to the label. Additionally, printed-on labels may be put directly on the pipe surface or another surface to be attached to the pipe surface.

Figure 2:
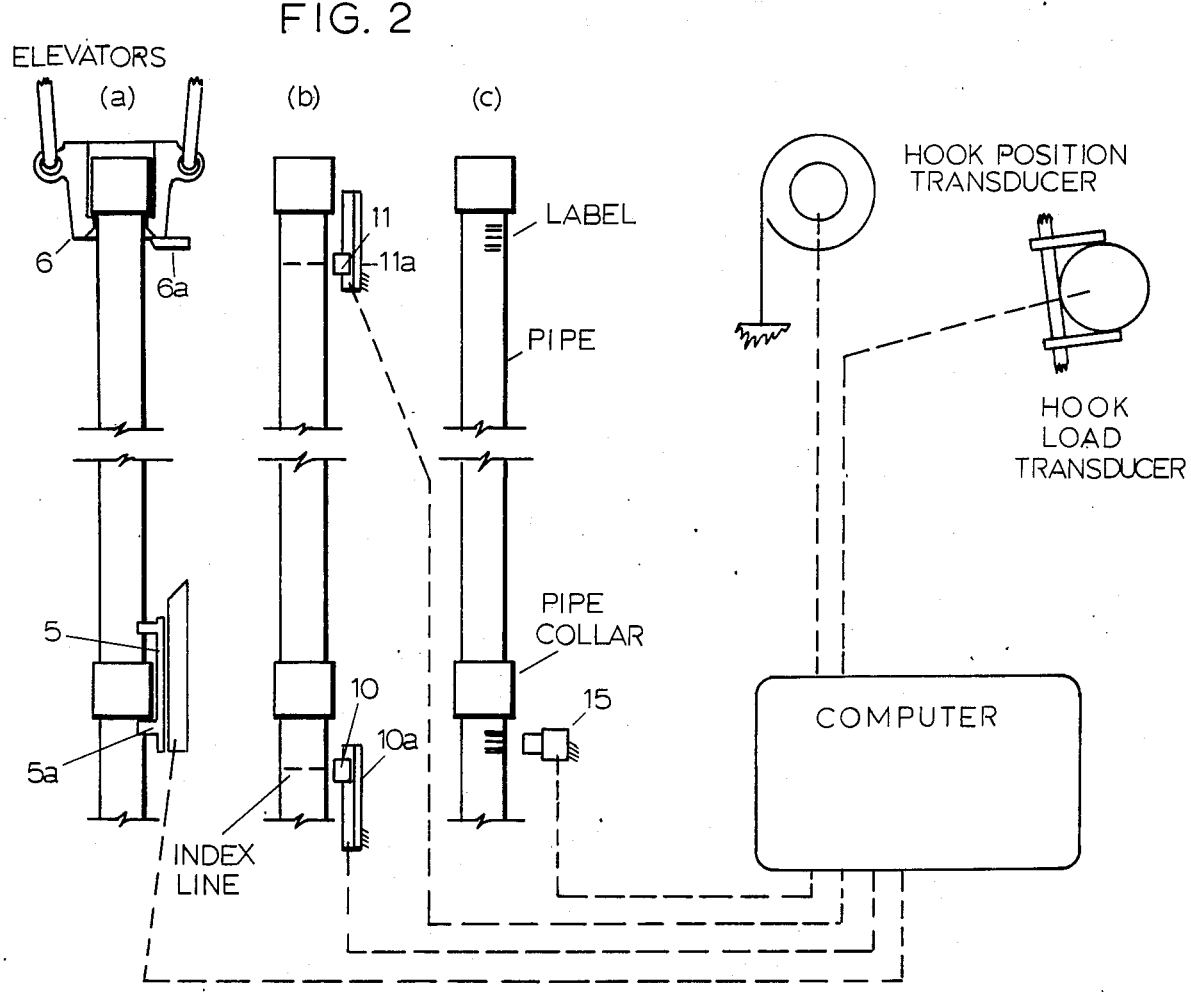
FIG. 2 is a generally schematic diagram of an alternate embodiment of the combination of the invention

FIG. 2 is the preferred embodiment of this invention for well site use. Pipe may not always be properly coded or even labeled when arriving at a well site for use. Alternative measuring systems are required. Three systems: (a), (b), and (c) are shown for making length inputs.

System (a) uses a laser mounted on a portable fixture 5. There are two "v" shaped legs 5a on the fixture. These legs are pushed against the pipe, and the contact between the two v shapes and the pipe cylindrical surface aligns the laser parallel with the pipe centerline. The fixture is pushed upward until axial motion is stopped when the lower leg abuts the pipe connecting collar. This establishes the lower axial position index line. The elevators 6 are common to a drilling rig, and when running collared pipe, lift the pipe string by engaging the lower surface of the upper collar. The laser target 6a is attached to the elevator at any stable point. The distance between the target and the lower plane of the upper connecting collar is known. When activated, the laser measures the distance from laser to target and feeds that informatin to the computer. The computer adds the known distance between target and upper collar index as well as the known distance between the laser reference plane and the lower surface of the lower connecting collar. The rig floor monitor displays the information as a reasonableness test and, on cue, transfers the length data to the pipe string tally register or data storage.

Length measurement system (b) assumes the existence of an axial position index line on serial pipe joints. Electromagnetic beam line reader 10 moves up and down on rail 10a to automatically position on the lower axial position index line. A similar reader 11 moves up and down on rail 11a to align with the upper axial position index line. The relative displacement of the two readers from known axial separation references is automatically read on cue by the computer. The measured separation between these serial lines is the dimension after thread make-up. If the pipe string is suspended by the upper collar at the time of measurement, the pipe will be measured under the same axial tension it will experience downhole. The length will be the true length as installed.

Once the line spacing is read, the dimension is displayed on the rig floor monitor for approval of reasonableness and, finally the dimension is entered into the pipe string tally register or data storage used.

Pipe having position axial index lines will most likely have a machine readable label. There is no reason not to incorporate the machine label reader with the system (b), and such will probably be the case. The label reader, however, is subsequently described.

System (c) presumes accurate length measurement is already accomplished, and the data is machine readable on the pipe surface. If drill string is involved, a reader of pencil size is passed, by hand, over the pipe joint serial number in a milled-out recess in the tool joint, preferably the pin end. The serial number goes to the computer. The serial number related data is accessed and, if predefined conditions are met, the data is briefly flashed on the monitor and directed to the drill string tally register.

If production pipe string is being installed, we prefer the use of painted-on full periphery bar codes for each pipe joint. These bar codes are familiar at grocer check-out counters. The bar codes can be read from some distance, and we prefer a stationary rig mounted reader 15. Further processing of data has been defined for the pencil reader and is the same for this reader.

Systems (b) and (c) can be combined for pipe string installation.

Existing art for the laser measurement and position analyzing means of system (b) are typified by the teachings of U.S. Pat. No. 4,427,882, which by reference is made part of this specification.

Existing art for bar code readers is typified by U.S. Pat. No. 4,431,912, which by reference is made part of this specification.

The state of the art in computer science makes it unnecessary to detail the process steps involved in further management of data to achieve the ends that will presently be described.

The pipe string tally register is complete with pipe bore size and pipe outside dimension. From this information, the pipe cross section area can be evolved and further processed to show strain per foot under specified axial stress. Total strain under specified hook load variation is a simple further program step. This information is one end product.

Further processing is required when the pipe string is stuck. In such cases, there will be an observed pipe stretch under a selected hook load increase. The computer is programmed to subtract the stretch, for the hookload change observed, of each joint in turn beginning at the top, from the total stretch until zero is reached. This will indicate the last joint stressed and will indicate the point at which the string is stuck. As so far defined, the pipe stretch and change in hook load will have to be keyed in and a pre-programmed action initiated to yield stuck point data. Hook load sensors and hook position transducers can render the load change and dimension change to automate these inputs. We prefer to start the excursion, for several reasons, with manual input. Load and position sensors are well established in the art and are not detailed. For hook position data, the U.S. Pat. No. 4,459,752 teaches the preferred system.

Pre-programmed functions will extract flow resistance data from the drill string tally and provide the collective flow resistance for the assembled drill string. This data can be used for a number of manual computation selections for flow ralated parameters. The drilling fluid specifications have to be manually keyed into the computer.

The fluid flow rate at which the drill string will deliver maximum hydraulic horsepower downhole is often needed. For this information, the standpipe pressure limit is then keyed into the system. Surface gear losses are also keyed in. We prefer to solve for zero slope of horespower versus flow rate to determine optimum flow rate. That information is the end product for this operation.

A print-out apparatus, connected to the computer in the usual fashion will print out the contents of the drill string or pipe string tally on cue. Pre-programming will print out only those specification factors preferred.

The preferred computer arrangement will have a time of occurrence data system. This timer will provide correlation with entry of each pipe joint into the string tally.

A continuous depth versus time log will require that the true length of the drill string, conrrected for all major modifying factors, be further modified by the distance between the top end of the drill string and the chosen earth related reference plane. The top end of the drill string is best defined as the top of the Kelly joint. The chosen reference plane is usually the earth surface. The U.S. Pat. No. 4,459,752 teaches a suitable method for determining the position of the drill string relative to some starting point such as the Kellyup position.

The true depth versus time log may be programmed to function at depth intervals or at time intervals. Time interval printouts are preferred. The printout may be spooled over a period of time and finally printed on cue.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The following definitions are offered as pertinent to the disclosure;

(a) positioning means includes the supports FIG. 1 and optionally the wheels 2;
(b) measuring means comprises laser system 1, and associated equipment commonly available;
(c) electronic processor includes calculators or computer type equipment commonly available;
(d) a label maker preferably includes the commonly available laser marking equipment programmable to write a label on metal in a preferred format;
(e) laser excitation refers to the act of firing a laser beam into metal to produce vapors subject to analysis by conventional methods, preferably atomic emission spectroscopy;
(f) machine readable refers to labels readable by conventional symbol pattern recognition equipment such as, but not limited to, bar code readers.

The invention having been described, what is claimed is:

1. In the measurement of pipe joint lengths and automatic labeling of the surface of each pipe joint, a combination comprising:
   (a) positioning means for positioning a joint of pipe;
   (b) measuring means arranged to measure the distance between surfaces, positioned by said positioning means, representing the effective length of said positioned pipe, said measuring means to produce an output signal representative of said effective length measured;
   (c) electronic processor means arranged to receive said output signal and comprising; manual input keyboard means, digital display means, means to process said output signal into numerical effective length for digital display, data memory register means capable of storing, for recall, said numerical effective length and associated data entered into said manual input keyboard means and means to deliver an output command signal representative of a label format and content; and
   (d) label maker means operatively associated with said positioning means, responsive to said output command signal, to physically and directly produce a label on a selected area of the surface of said positioned pipe.

2. The combination of claim 1 further provided with data accumulation means to provide an inventory record of pipe measured.

3. The combination of claim 1 further providing that said measuring means comprise; a laser beam distance measuring system.

4. The combination of claim 1 in which said label maker means is a laser beam marking system.

5. The combination of claim 1 further provided with means to mark an axial position index line about at least part of the pipe periphery in at least one selected location on the pipe surface.

6. The combination of claim 1 further provided with laser excited atomic emission spectroscopy means operatively associated with said electronic processor means to confirm at least some of the material specification and to so note on said label.

7. The combination of claim 1 further provided with an intermediate step of writing on the surface of a prepared label material which, in turn, is attached to the surface of said pipe.

8. The combination of claim 1 further provided with pipe diameter and pipe wall thickness measuring means operatively associated with said electronic processor means to at least confirm the pipe size specification and to so note on said label.

9. The combination of claim 1 further provided with pipe material hardness tester means operatively associated with said electronic processor means to at least confirm the strength specification of the pipe material and to so note on said label.

* * * * *